United States Patent [19]

Tomohisa et al.

[11] Patent Number: 4,780,768

[45] Date of Patent: Oct. 25, 1988

[54] HALFTONE IMAGE RECORDING METHOD AND APPARATUS

[75] Inventors: Kunio Tomohisa; Masamichi Cho, both of Kyoto, Japan

[73] Assignee: Dainippon Screen Mfg. Co., Ltd., Kyoto, Japan

[21] Appl. No.: 903,899

[22] Filed: Sep. 4, 1986

[30] Foreign Application Priority Data

Sep. 6, 1985 [JP] Japan .................................. 60-198101

[51] Int. Cl.⁴ .............................................. H04N 1/21
[52] U.S. Cl. ..................................... 358/298; 358/283
[58] Field of Search ............... 358/296, 298, 302, 280, 358/283, 282, 284

[56] References Cited

U.S. PATENT DOCUMENTS 4,433,346  2/1984  Stoffel et al. .................. 358/283 X
4,447,833  5/1984  Sano et al. .................... 358/283 X Primary Examiner—Clifford C. Shaw
Attorney, Agent, or Firm—Lowe, Price, LeBlanc, Becker & Shur

[57] ABSTRACT

A halftone image recording apparatus has an interpolating function for interpolating previously obtained first halftone pattern data in the main scanning direction to obtain second halftone pattern data. Comparisons between input image signals and the second halftone pattern data per pixel are made to expose a photosensitive material on the basis of the results of the comparisons thereby to create a halftone plate. Through the interpolation, the recording density in the main scanning direction is increased in response to the rate of increase in pixel density.

28 Claims, 14 Drawing Sheets

85L, θ=45°, k=m=1
NON-INTERPOLATED
12×12 = 144 PIXELS

85L, θ=45°, k=m=1
INTERPOLATED
(12×2)×12 = 288 PIXELS

133L, θ = 45°, k = m = 1

HALFTONE PATTERN DATA IN MEMORY 5

133L, θ=45°, k=m=1

| $D_1$ | $D_2$ | $D_3$ | $D_4$ | ... |
|---|---|---|---|---|
| $D_{17}$ | $D_{18}$ | $D_{19}$ | ... | |
| $D_{33}$ | $D_{34}$ | ... | | |
| ... | | | | |
| | | | | |

$\underline{C_1}$

HALFTONE PATTERN DATA IN RAM 24

133L, θ=45°, k=m=1

NON-INTERPOLATED

| $D_1$ | $D_2$ | $D_3$ | $D_4$ | ... |
|---|---|---|---|---|
| $D_{17}$ | $D_{18}$ | $D_{19}$ | ... | |
| $D_{33}$ | $D_{34}$ | ... | | |
| ... | | | | |
| | | | | |

$\underline{C_2}$

HALFTONE PATTERN DATA IN MEMORY 5

85L, θ = 45°, k = m = 1

HALFTONE PATTERN DATA IN RAM 24
85L, θ = 45°, k = m = 1

INTERPOLATED  (12 × 2) × 12

▨ = DATA OBTAINED BY INTERPOLATION

RECORDED IMAGE
85L, θ=45°, k=m=1

FIG. 13A
100L, θ=45°
k = m = 2
NON-INTERPOLATED
20 × 20
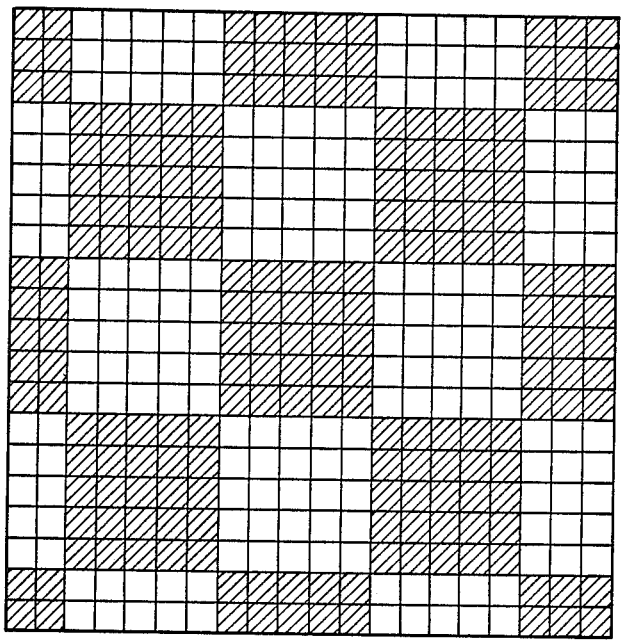
FIG. 13B
100L, θ=45°
k = m = 2
INTERPOLATED
(20 × 2) × 20
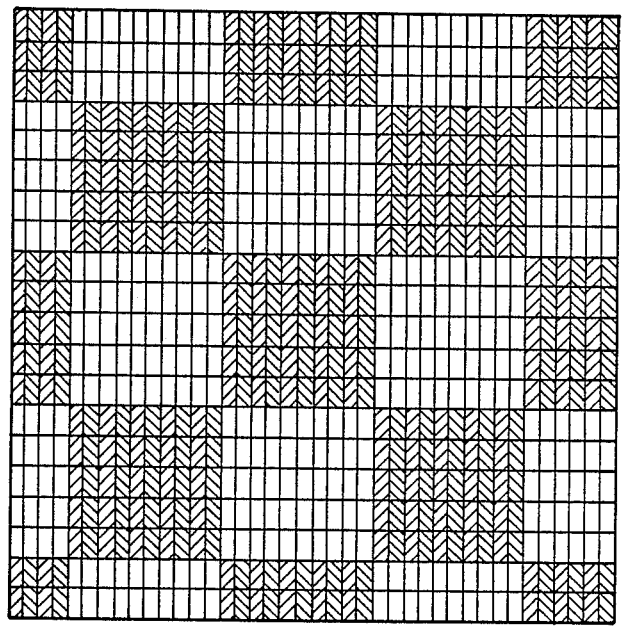
 = ORIGINAL DATA
 = DATA OBTAINED BY INTERPOLATION

HALFTONE IMAGE RECORDING METHOD AND APPARATUS

BACKGROUND OF THE INVENTION

1. Field of the Invention

The present invention relates to halftone image recording methods and apparatus, and more particularly, to a halftone image recording method and apparatus improved in tone reproducibility.

2. Description of the Prior Art

In a halftone image recording apparatus controlled by an electronic circuit such as a process scanner provided with a dot generator, it is generally required to make screen pitches selectable according to the application of images to be recorded. In order to satisfy such a requirement, most of the halftone image recording apparatuses are constructed so that desired screen pitch can be selected.

However, when the scanning line pitch for recording is increased while correspondingly fixing the spot diameter of a recording laser beam at a relatively large size on a photosensitive material, output pixels arrayable in one halftone dot are decreased in number in case of a small screen pitch (hereinafter referred to as a "fine screen"), whereby required density expression grades cannot be obtained. When, to the contrary, the scanning line pitch is decreased while fixing the spot diameter of the beam at a relatively small size, the recording time is increased in the case of a large screen pitch (hereinafter referred to as a "coarse screen").

In order to solve such a problem, a technique is proposed in Japanese Patent Application No. 231109/1983, for example, in which the beam spot diameter is switched responsively to the screen pitch in a flat-bed type scanner by employing a beam expander. Further, disclosed in Japanese Patent Application No. 025155/1984 is such a technique whereby switching of the beam spot diameter in a drum type process scanner is provided by employing a zoom lens, etc.

However, it is not practical in the flat-bed type process scanner to prepare beams with various spot diameters corresponding to respective screen pitches when the apparatus is designed with various (e.g., six) selectable screen pitches. In the flat-bed scanning system, further, it is necessary to increase the focal length of an image forming lens of the optical system in order to obtain enough scanning length, and hence it is difficult to reduce the beam spot diameter to less than several tens of $\mu$ms.

Therefore, it is necessary to select the relation between the recording beam spot diameter and the screen pitch so that halftone images for process printing can be recorded in a relatively short time using a relatively large recording beam spot diameter (i.e., recording scanning line pitch) without reducing density expression grades. Thus, in a process scanner of the flat-bed scanning type previously designed by the inventor herein, for example, two types of beam spot diameters of 34 $\mu$m and 17 $\mu$m are prepared and respectively used for the fine screen and the coarse screen.

However, there has been no technique for further increasing the density expression grades while maintaining the recording speed in both of the process scanner of the flat-bed scanning type and the drum-type, and no ideas have heretofore been proposed to solve such a problem.

SUMMARY OF THE INVENTION

The present invention is directed to a halftone image recording method for creating a halftone plate by sequentially making comparisons between input image signals to be recorded and halftone pattern data per pixel along scanning directions and outputting halftone dot recording signals responsive to the results of the comparisons.

In accordance with the apparatus of the present invention, there are provided memory means for storing previously obtained first halftone pattern data and interpolation means for reading the first halftone pattern data from the memory means to obtain a second halftone pattern data therefrom by an interpolation in the main scanning direction. A comparator means sequentially compares the input image signals and the second halftone pattern data per pixel at a timing responsive to the rate of increase in pixel density in the main scanning direction through the interpolation thereby to output halftone dot recording signals corresponding to the results of the comparison. An exposure means is provided for scanning and exposing a prescribed photo-sensitive material in response to the halftone dot recording signals to create a halftone plate in which recording density in the main scanning direction is increased in response to the rate of increase in pixel density through the interpolation.

In another aspect of the present invention, the first halftone pattern data are prepared in correspondence to respective ones of a prescribed number of halftone structure types. The halftone image recording apparatus thus further includes screen structure selecting means for externally selecting a desired one from the halftone screen structure types. In this case, interpolation is performed when the selected screen structure is that of a prescribed type.

In another aspect of the present invention, employed as first and second halftone pattern data with respect to a specific screen structure are halftone pattern data in the unit of a region larger than the minimum region formed by a plurality of halftone dots and satisfying a prescribed repeating rule in both the main and sub-scanning directions.

In the present invention, the term "screen structure" is used to indicate the structure having regular and repetitive density peaks and troughs for creating halftone plates definitely specified by screen pitches and screen angles etc., i.e., a structure simulating unsharp halftone dots of a conventional contact screen.

Further, the term "pixel" employed with respect to recording operation in the following description is conceptually different from the pixel (input pixel) relating to image resolving power, and indicates the minimum exposure unit region in a recording area. Generally, the "pixel" is smaller than the input pixel, whereas the same may be matched in size to the input pixel.

Accordingly, an object of the present invention is to provide a halftone image recording method and apparatus which can substantially improve tone reproducibility or density expression grades without reducing the recording speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13A, 13B and 14 are examples of recorded images.

DESCRIPTION OF THE PREFERRED EMBODIMENTS

Overall Structure and Operation of First Embodiment

Figure 1:
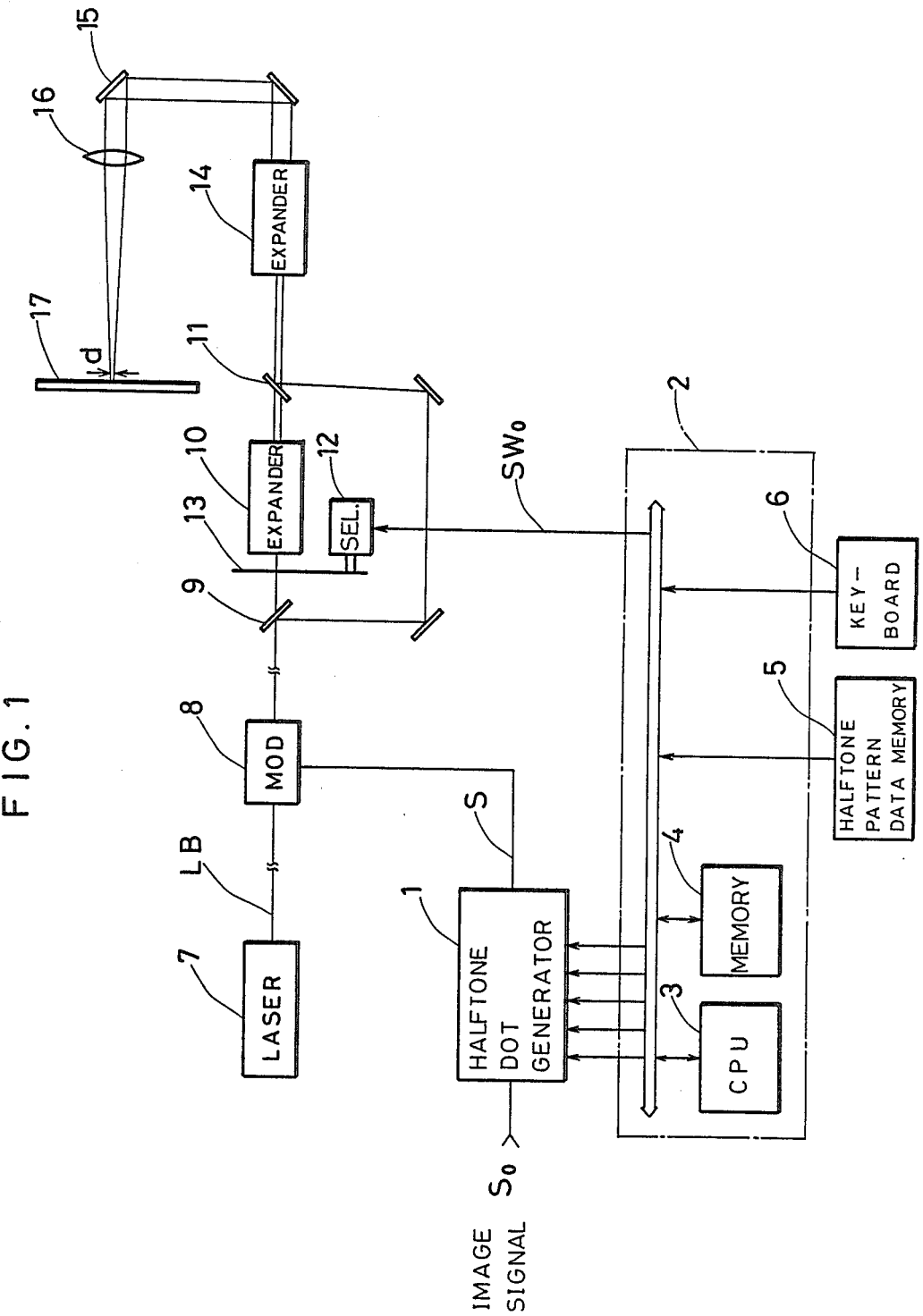
FIG. 1 is a schematic block diagram showing the entire structure of a first embodiment of the present invention.

FIG. 1 is a schematic block diagram showing the structure of a first embodiment of the present invention which is applied to a process scanner of a flat-bed scanning system. Referring to FIG. 1, an image signal $S_O$ to be recorded is inputted in a halftone dot generator 1, details of which are hereinafter described.

The halftone dot generator 1 is connected to a microcomputer 2 including a CPU 3 and a memory 4. The microcomputer 2 is connected to a halftone pattern data memory 5 (e.g., a floppy disc) containing prestored halftone pattern data (first halftone pattern data) corresponding to respective screen pitches and screen angles as hereinafter described. The microcomputer 2 reads halftone pattern data with respect to a screen structure corresponding to a screen pitch and a screen angle externally selected by input from a keyboard 6. The first halftone pattern data are subjected to interpolation processing as hereinafter described, to provide second halftone pattern data. The second halftone pattern data thus obtained are supplied to the halftone dot generator 1. On the basis of the data and the input image signal $S_O$ to be recorded, the halftone dot generator 1 generates an exposure output signal S for providing an unsharp halftone dot image, and outputs the same.

On the other hand, a laser oscillator 7 serving as an exposure light source radiates a laser beam LB, which is modulated by an acousto-optical modulator 8 and divided into two parts by a half mirror 9. One of the parts is doubled in light beam diameter by a beam expander 10, while the other part bypasses the beam expander 10. After that, both of these beam parts are combined into a single optical path by another half mirror 11. In practice, however, a rotary solenoid 12 is rotated by a switching signal $SW_O$ from the microcomputer 2 so that a shutter 13 selectively intercepts one of the said two optical paths. Therefore, a second beam expander 14 provided in a subsequent stage receives the beam passing through the other one of the two optical paths.

The laser beam passing through the second beam expander 14 is reflected at a galvano mirror 15, to be supplied through an $f\theta$ lens 16 on a photosensitive material 17. The exposure is performed simultaneously to a scanning of the laser beam for forming a halftone plate. At this time, a beam spot diameter d can be switched to one of the above indicated two sizes by selecting the cut-off position of the shutter 13. In the following description, it is supposed that the beam spot diameter d can be switched between two sizes of 17 μm and 34 μm. The optical system as shown in FIG. 1 is similar to that disclosed in the aforementioned Japanese Patent Application No. 231109/1983, and is not directly related to the features of the present invention, and hence detailed description thereof is omitted.

Details of Repetitive Unit Halftone Dot Region and Interpolation Processing

Description is now made on the princinple of halftone dot generation according to this embodiment along a concept of "repetitive unit halftone dot region" and interpolation processing.

A. Repetitive Unit Halftone Dot Region

Consider such case where the screen pitch is not sufficiently large with respect to the scanning line pitch or the size of the beam spot diameter d responsive thereto, and hence required density expression grades cannot be obtained by a single halftone dot. In such a case, according to this embodiment, a plurality of adjacent halftone dots are combined to express a gradation level by all the halftone dots. For example, in the case of a square type halftone dot screen, assume that the relation between the screen pitch P and the number of required gradation G is expressed as the following inequality (1).

$$(P/d)^2 < G \tag{1}$$

For this case, an integer J equal to or greater than two satisfying the following expression (2) can be obtained:

$$J \times (P/d)^2 > G \tag{2}$$

and a graduation level is expressed by the dot group consisting of J pieces of halftone dots.

When, however, the integer J satisfying the above expression (2) is arbitrarily selected to combine the halftone dots, a problem in recording operation occurs for the following reason. First, note that it is necessary to previously store quantized halftone dot patterns in a memory for halftone dot recording, in general. However in a combination of a plurality of halftone dots, halftone dot groups cannot necessarily be regularly arrayed on a recorded image when the halftone dot groups are formed through an arbitrary selection of the integer J. In this case, therefore, the positional relation of halftone dots varies with the groups, and hence halftone pattern data must be prepared per group.

Thus, it is important to select the integer J so that a quantized pattern is regularly repeated in both of the main and sub-scanning directions along a cycle of some halftone dots.

This corresponds to such a condition that, assuming that $\theta$ represents a screen angle and k and m represent integers, the angle must be selected a follows:

$$\tan\theta = Pk/Pm = k/m \tag{3}$$

When the expression (3) holds, repetition is made with a unit region determined by k and m. The condition of the expression (3) is called a "rational tangent condition".

Figure 2:
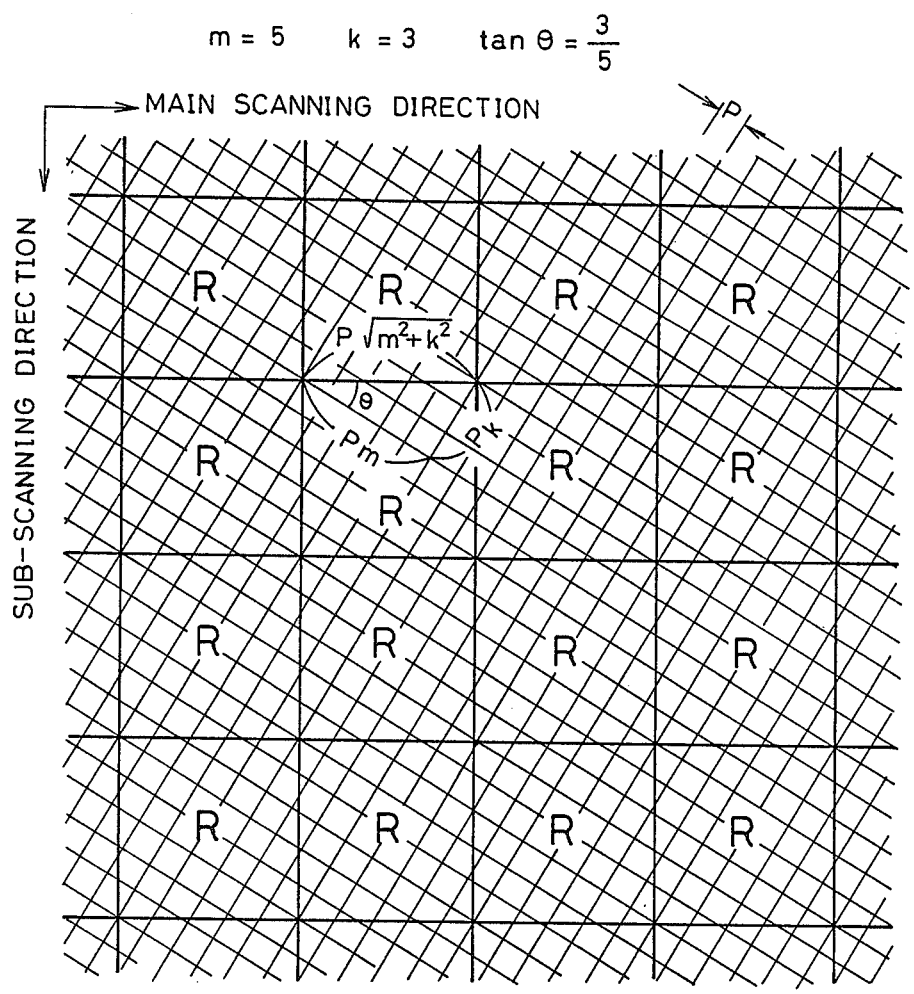
FIG. 2 illustrates a repetitive unit halftone dot region.

When this condition is satisfied, obtained are arrays in which a square region R is cyclically repeated in both of the main and sub-scanning directions as shown in FIG. 2. The square region R or a region in a repetitive cycle equivalent thereto is called a "repetitive unit halftone dot region" in this specification. As hereinafter described with examples, employed as the repetitive unit halftone dot region in a second invention of the present patent application is a region larger than the minimum region formed by a plurality of halftone dots and satisfying the aforementioned repetition rule, thereby to substantially increase the number of the density expression grades prior to interpolation.

One side of the repetitive unit halftone dot region R as shown in FIG. 2 becomes $P\sqrt{m^2+k^2}$ with the introduction of the concept of the repetitive unit halftone region, and hence the number S of halftone dots included in this region R is as follows:

$$S = P^2(m^2+k^2)/P^2 = m^2+k^2 \tag{4}$$

Therefore, the number S may be selected as the integer J in the above expression (2). In most cases, however, the generally employed screen angle $\theta$ cannot be set to rigorously satisfy the expression (3), and hence the values $\theta$, k and m are selected to approximately satisfy condition (3).

Figure 3:
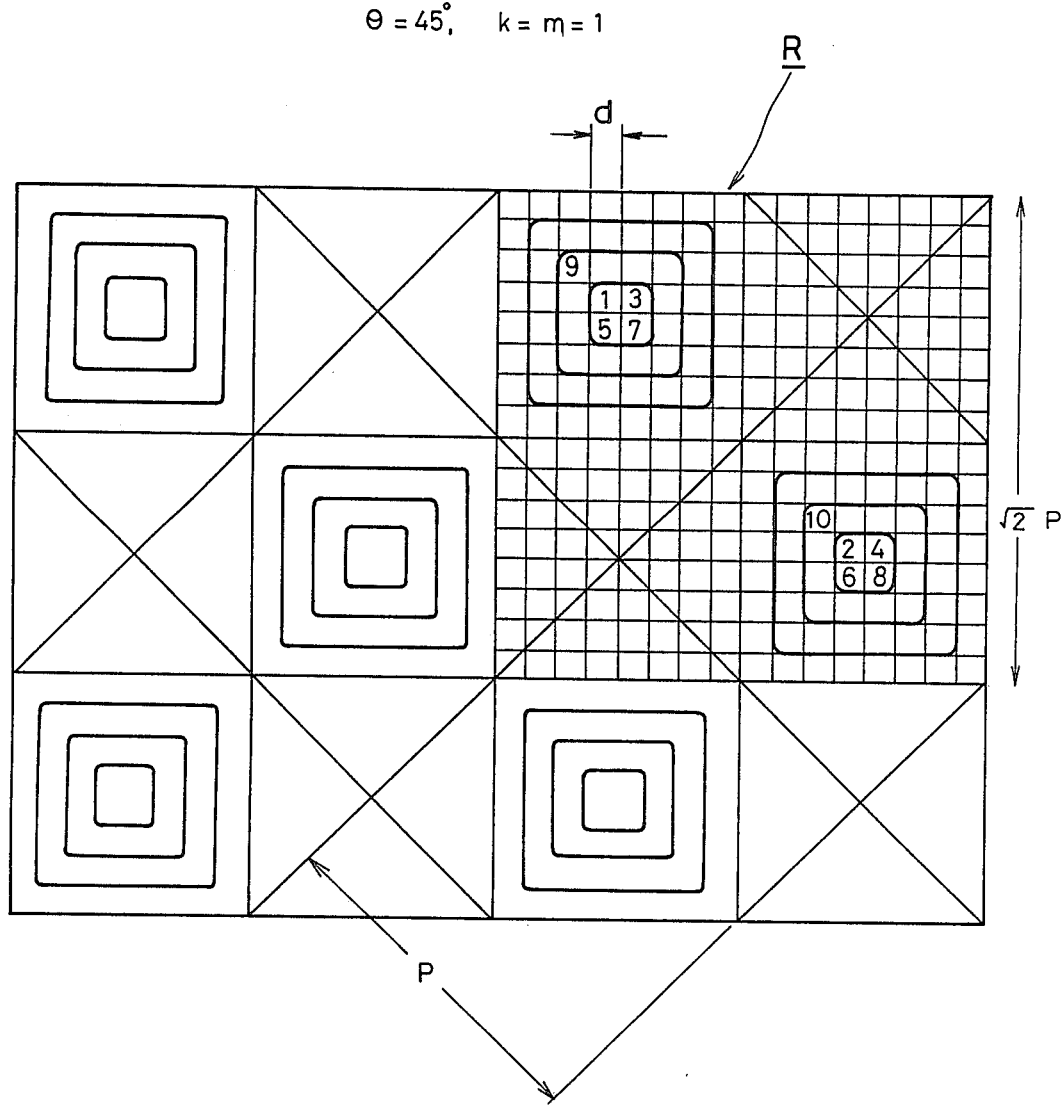
FIG. 3 to 5 are diagrams showing examples of created halftone pattern data.

FIG. 3 shows an example of a quantized halftone pattern processed in view of the above description. In the case of Fig. 3, $\theta = 45°$ and k=m=1, while a repetitive unit halftone dot region R is formed by two halftone dots (S=2).

In each halftone dot, a halftone dot pattern (shown by contour lines) is formed on the basis of a desired pattern function. The pattern function itself may be common to the respective halftone dots.

Then, quantization is performed in response to the size of the output pixels (beam spot diameter d as employed) and required number of density expression grades. In this process, it may happen that a plurality of pixels are at the same density level. Therefore, it is necessary to previously determine the rule as to which pixel within these pixels is to be quantized to a higher level. The level order of the pixels thus quantized is partially shown by numerals in FIG. 3.

Figure 4:
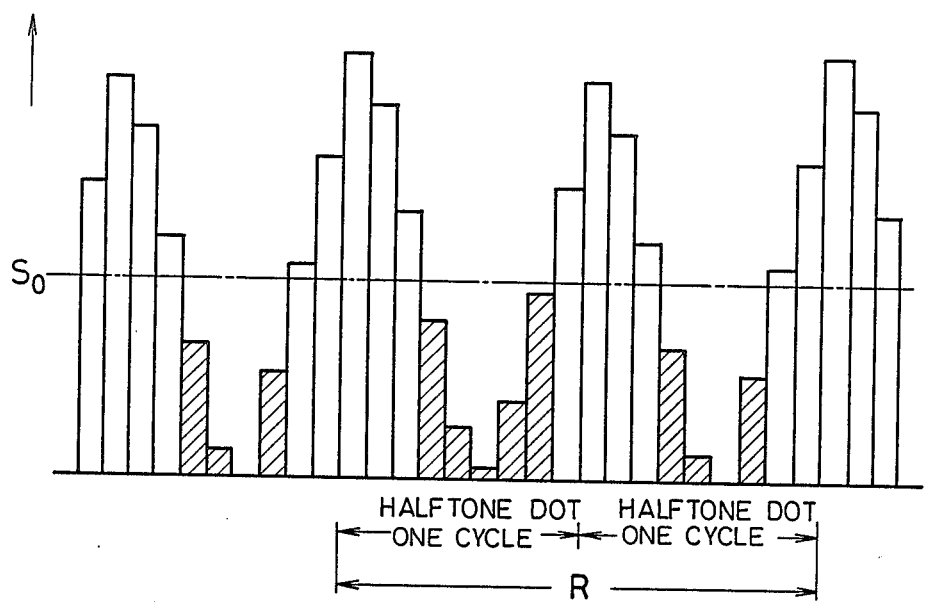

It is to be noted here that, even if the same pattern function is employed for the respective halftone dots, quantization patterns of the respective halftone dots in the repetitive unit halftone dot region are not identical to each other since the quantization is made in the said region rather than in the individual halftone dot. FIG. 4 typically shows such a circumstance. Comparing the density level $S_O$ of image input signal with quantization patterns of FIG. 4, pixels in quantization levels lower than the density level $S_O$ (shown by hatched bars) are asymmetrically distributed between respective halftone dots within one repetitive unit halftone dot region. Since such asymmetry can be formed in the repetitive unit halftone dot, the number of gradations thereof becomes larger than that of one halftone dot.

Namely, when X pixels are "black" in a first halftone dot and, for example, (X+1) pixels are "black" in a second halftone dot in case where "black and "white" are employed to express whether or not exposure is made, the total number of the "black" pixels in a repetitive unit halftone dot region is as follows:

$$[(X+1)+X]/2 = X+1/2 \tag{5}$$

whereby a gradation level between X and (X +1) can be expressed.

Figure 5:
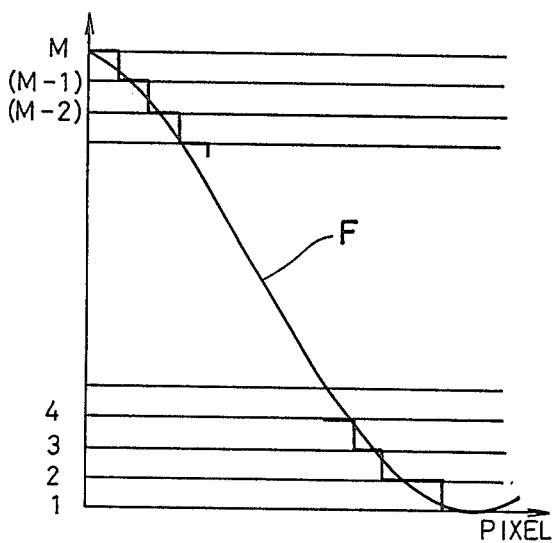
Figure 5:
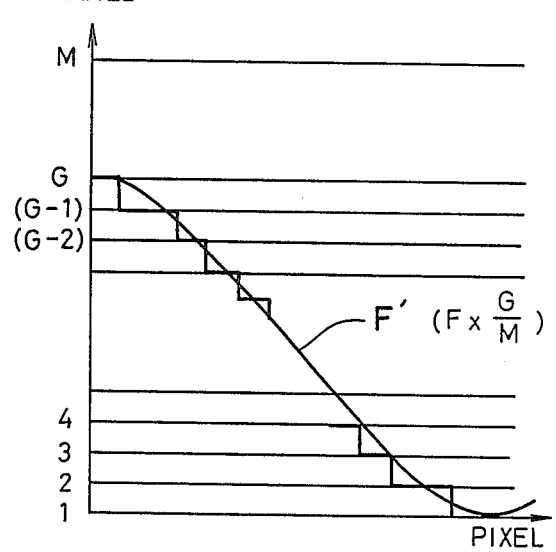

In a case where the number M of pixels in the repetitive unit halftone dot region is larger than the number G of the desired density expression grades, the pattern function F is multiplied by (G/M) to be compressed to F' as shown in FIG. 5, thereby to perform quantization to G levels.

B. Interpolation Processing

Thus, the density expression grades can be substantially improved through the aforementioned processing even if the screen pitch P is not sufficiently large in comparison with the scanning line pitch or the beam spot diameter d. However, another processing is required when the unit halftone dot region cannot be sufficiently increased due to memory capacity etc. or when a higher number of gradation is required.

Thus, interpolation processing is performed in the first to third embodiments herein. However, the scanning time and the recording time is substantially increased if halftone dot pattern data are interpolated along the main scanning direction and the sub-scanning direction. According to the present invention, therefore, interpolation is made only in the main scanning direction.

Figure 6:
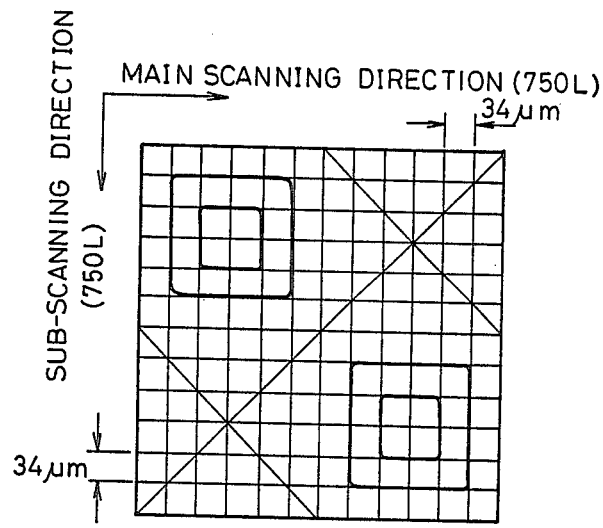
FIGS. 6(a) and 6(b) are respectively representations of non-interpolated and interpolated pixels undergoing scanning.
Figure 6:
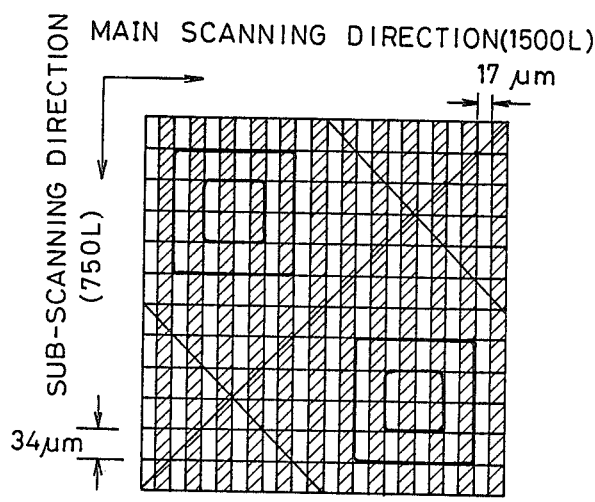

FIG. 6 illustrates the principle of interpolation as to the case of $\theta = 45°$ and m=k=1. Referring to FIG. 6(a), it is assumed that the screen pitch is 85 line/inch (this unit is hereinafter indicated by symbol "L") and the beam spot diameter d is 34 μm. When no interpolation is made in this case, the scanning pitch in a recording process is 750L in both the main and sub-scanning directions and the number M of the density expression grades is M=144. This value M=144 is obtained in such a manner that a divisional number N of one side of the repetitive unit halftone dot region is expressed follows:

$$N = (P\sqrt{m^2+k^2})/d \tag{6}$$

and the number M of density expression grades is expressed as follows:

$$M = N^2 = P^2(m^2+k^2)/d^2 \tag{7}$$

When the required number G of density expression grades is G=256, the value M=144 does not exceed the number G. Therefore, in that case, interpolation is performed in the main scanning direction. Namely, as shown in FIG. 6(b), respective original pixels are divided into two parts respectively by straight lines which are parallel in the sub-scanning direction. Referring to FIG. 6(b), one of the respective two parts is shown by a vacant cell and the other is shown by a hatched cell. Previously given halftone pattern data are given for the new pixels shown by vacant cells, while mean values of respective two halftone pattern data previously given for original pixels adjacent in the main scanning direction are given for the new pixels shown by the hatched cells which serve as the pixels added by interpolation. Corresponding with the interpolation, scanning in the main scanning direction is performed at the screen pitch of 1500L which is equal to twice the recording density 750L as hereinabove described, while scanning in the sub-scanning direction is performed at the pitch of 750L.

Thus, the pixels are doubled in number in the main scanning direction, whereby the number M of density expression grades is 144×2=288, to sufficiently reserve the required number 256 of density expression grades. The recording time is not increased since no interpolation is made in the sub-scanning direction.

Figure 7:
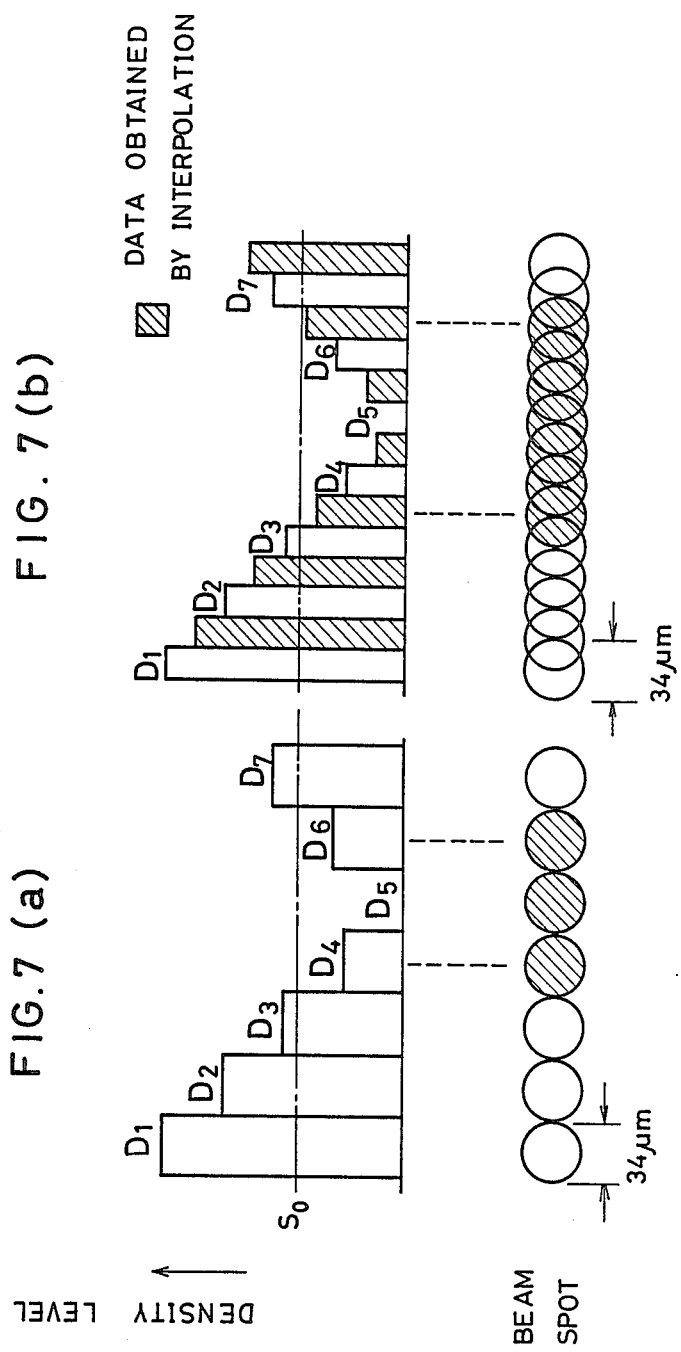
FIG. 7 is an diagram showing an exposure image of the present invention.

As shown in FIG. 7, a beam providing circular spots at the photosensitive material 17 is employed as an optical beam for exposure. Even if previously given halftone pattern data $D_1$, $D_2$, . . . are commonly used, a recorded image with smoother halftone dots can be obtained in the interpolated case (FiIG 7(a)) in comparison with non-interpolated case (FIG. 7(b)).

C. Data Examples

Table 1 shows examples of data for respective screen pitches in the case of $\theta = 45°$. This Table 1 corersponds to the first and second embodiments, and the repetitive unit halftone dot region is minimized (k=m=1). In Table 1, interpolation is performed for 85L and 100L in the coarse screen and 150L and 175L in the fine screen. As shown in Table 1, the density expression grades in the coarse screen of 85L and 100L and the fine screen of 150L and 175L are in small values of 144, 100, 196 and 100L respectively, in the non-interpolated case. Such density expression grades can be doubled by performing interpolation, thereby to obtain excellent gradients. With respect to 65L and 133L, $N^2 = 256$ and sufficiently large density expression grades are obtained without interpolation, while interpolation may be also performed in these cases so that $N^2 = 512$.

TABLE 1

Screen Angle = 45°
n = Screen Line Pitch, d = Beam Spot Diameter (μm),
tan θ = k/m, S = Number of Halftone Dots in Unit Halftone Dot Region

| Type | n | d | k/m (s) | N ($N^2$) | Interpolation | $N^2$ upon Interpolation | Main Scanning (Sub-scanning) |
|------|---|---|---------|-----------|---------------|--------------------------|------------------------------|
| Coarse | 65L | 34 (750L) | 1/1 (2) | 16 (256) | No | — | 750L (750L) |
|  | 85L | 34 (750L) | 1/1 (2) | 12 (144) | Yes | 288 | 1500L (750L) |
|  | 100L | 34 (750L) | 1/1 (2) | 10 (100) | Yes | 200 | 1500L (750L) |
| Fine | 133L | 17 (1500L) | 1/1 (2) | 16 (256) | No | — | 1500L (1500L) |
|  | 150L | 17 (1500L) | 1/1 (2) | 14 (196) | Yes | 392 | 3000L (1500L) |
|  | 175L | 17 (1500L) | 1/1 (2) | 12 (144) | Yes | 288 | 3000L (1500L) |

In case of 100L, however, the number of density expression grades upon interpolation is 200 and it is preferable to further increase this number when 256 or more gradation levels are required. Table 2 shows examples of data corresponding to the case of making the values k and m with respect to the patterns subjected to the interpolation larger than the minimum values in consideration of that circumstance. This Table 2 corresponds to an embodiment of the third embodiment.

As is obvious from Table 2, the number of density expression grades are considerably increased through employment of the unit halftone dot region having a large size by increasing the values m and k. Needless to say, the density expression grades can be also improved with respect to 65L and 133L by increasing the values m and k.

It is of course possible to reserve 256 gradation levels by simply increasing the values k and m without performing interpolation, but the recorded image can be made smoother by performing the interpolation along the second embodiment.

Although only the case of $\theta = 45°$ is shown in this specification, similar data can also be created with respect to other angles (e.g., $\theta = 0$, ±15, ±30 etc.) on the basis of the above expressions (4), (6) and (7). It is to be noted that pattern data with respect to $\theta = -45°$ are identical to the data in case of $\theta = 45°$ when the shape of the unit halftone dot region is a square, and hence the data for $\theta = 45°$ may be commonly used for $\theta = 31\ 45°$.

TABLE 2

Screen Angle = 45°
n = Screen Line Pitch, d = Beam Spot Diameter (μm),
tan θ = k/m, S = Number of Halftone Dots in Unit Halftone Dot Region

| Type | n | d | k/m (s) | N ($N^2$) | Interpolation | $N^2$ upon Interpolation | Main Scanning (Sub-scanning) |
|------|---|---|---------|-----------|---------------|--------------------------|------------------------------|
| Coarse | 65L | 34 (750L) | 1/1 (2) | 16 (256) | No | — | 750L (750L) |
|  | 85L | 34 (750L) | 2/2 (8) | 24 (576) | Yes | 1152 | 1500L (750L) |
|  | 100L | 34 (750L) | 2/2 (8) | 20 (400) | Yes | 800 | 1500L (750L) |
| Fine | 133L | 17 (1500L) | 1/1 (2) | 16 (256) | No | — | 1500L (1500L) |
|  | 150L | 17 (1500L) | 2/2 (8) | 28 (784) | Yes | 1568 | 3000L (1500L) |
|  | 175L | 17 (1500L) | 2/2 (8) | 24 (576) | Yes | 1152 | 3000L (1500L) |

Further, in both of 65L and 133L in Table 2, N=16 and hence the relation between the recording beam spot diameter and the screen structure is common to these screen densities. Thus, the pattern data for these screen density can be commonly stored in the halftone pattern data memory 5. This also applies to 85L and 175L in Table 2, and further to the case of Table 1.

Detailed Structure and Operation of First Embodiment

Figure 8:
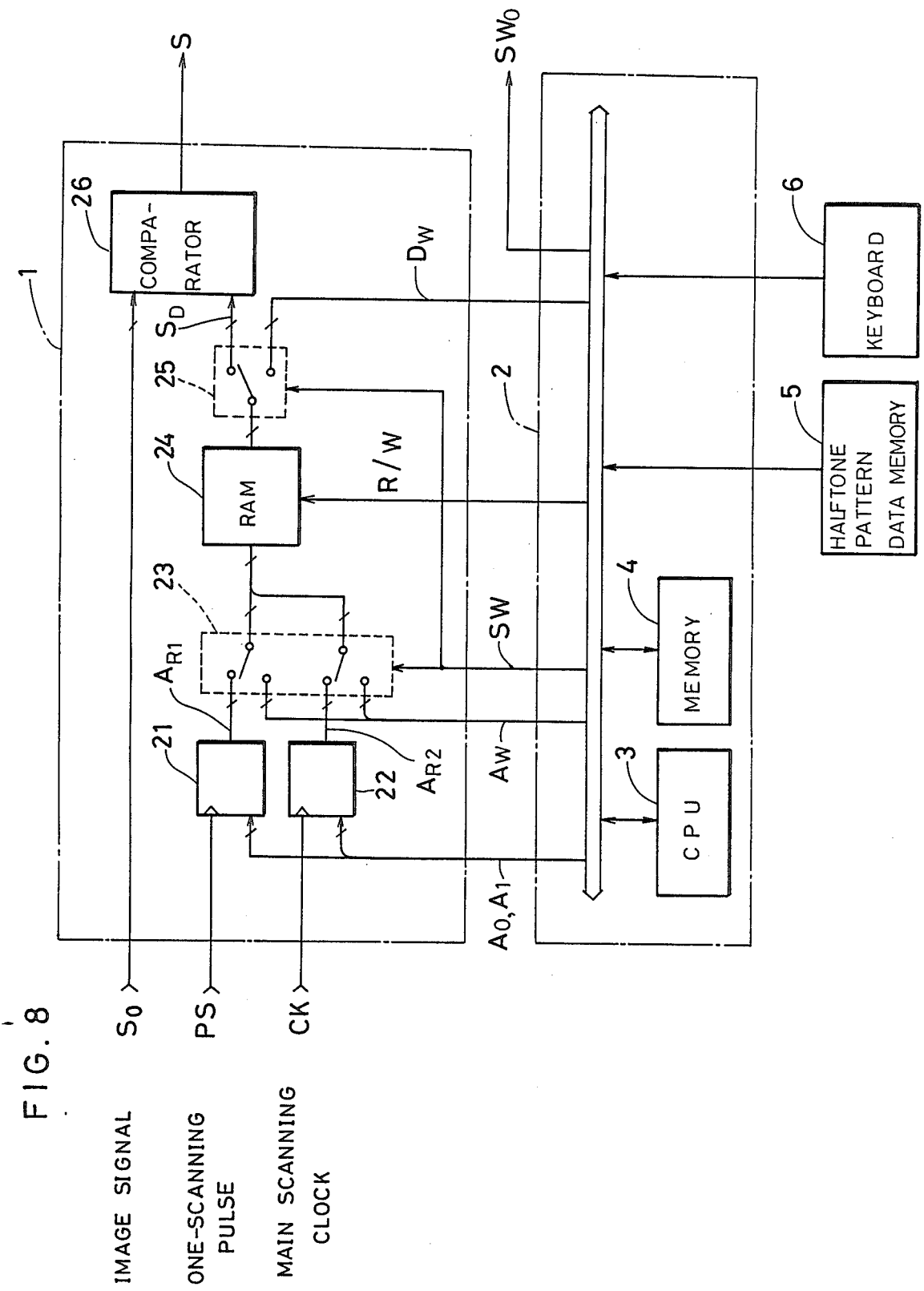
FIG. 8 is a block diagram showing the detailed structure of the apparatus as shown in FIG. 1.

On the principals of the above description, the detailed structure of the embodiment as shown in FIG. 1 is now described with reference to FIG. 8 showing a halftone dot generator 1. Referring to FIG. 8, a halftone pattern data memory 5 prestores first halftone pattern data in accordance with respective screen structures, i.e., respective screen pitches and screen angles. The first halftone pattern data corresponds to the pattern data before interpolation is performed and can be created on the basis of the aforementioned principles. It is to be noted that within the halftone pattern data, those identical in relation between selected beam spot diameter and screen structure are stored as common data.

When an operator inputs a desired screen pitch and screen angle through a keyboard 6 thereby to select the screen structure, a CPU 3 reads halftone pattern data corresponding to the screen structure from the halftone pattern data memory 5. At this time, a RAM included in the halftone dot generator 1 is write-enabled by an R/W signal from the CPU 3. By a switching signal SW supplied from the CPU 3, two switches 23 and 25 for selecting input/output of the RAM 24 are controlled to select a write address signal $A_W$ and a write data signal $D_W$ from the CPU 3, respectively. The halftone pattern data read from the halftone pattern data memory 5 serve as the write data signal $D_W$, to be stored in the address in the storage area of the RAM 24 designated by the write address signal $A_W$.

When the selected screen structure corresponds to that to be interpolated, the CPU 3 calculates interpolation values (e.g., mean values of the data for adjacent pixels in the main scanning direction) on the basis of the aforementioned first halftone pattern data read from the halftone pattern data memory 5, thereby to store the obtained second halftone pattern data including the interpolation data in the RAM 24. The halftone pattern data memory 5 prestores data for indicating whether or not interpolation is to be performed for the screen structure.

When the data are all written in the RAM 24 and the apparatus enters a recording mode, the CPU 3 supplies preset signals $A_0$ and $A_1$ to a sub-scanning address counter 21 and a main scanning address counter 22 as shown in FIG. 8 respectively. Thus, contents of these counters 21 and 22 are preset at values corresponding to the initial address of the available area of the RAM 24. Simultaneously set are repeat numbers of the counters 21 and 22.

A timing signal generator (not shown) supplies one-scanning pulses PS and main scanning clocks CK respectively to the counters 21 and 22, which in turn count these pulses to generate a sub-scanning address signal $A_{R1}$ and a main scanning address signal $A_{R2}$, respectively. The one-scanning pulses PS and the main scanning clocks CK are at pulse intervals corresponding to the vertical sub-scanning pitch and the main scanning pitch. However, in the case where interpolation is performed for recording, the pulse interval of the main scanning clocks CK is one-half the original pulse interval. Thus, interpolation is executed at a timing corresponding to the rate of increase in pixel density in the main scanning direction through interpolation.

On the other hand, the switch 23 selects the address signals $A_{R1}$ and $A_{R2}$ in the recording operation. The address signals $A_{R1}$ and $A_{R2}$ are supplied to the address input terminals of the RAM 24 which is read-enabled by the R/W signal. In the recording operation, the switch 25 is connected to the terminal for supplying a data signal $S_D$ to the comparator 26. Therefore, the halftone pattern data read from the RAM 24 are inputted to a comparator 26 through the switch 25.

The comparator 26 is supplied with an image signal $S_O$ to be recorded as another input, and compares the two input signals to supply an exposure output signal S as a halftone dot recording signal which enters a "high" state only when the input image signal $S_O$ is larger than the halftone pattern data. The exposure output signal S is inputted in the optical system as hereinabove described with reference to FIG. 1, to control an optical beam for exposing a photosensitive material.

At this time, the shutter 13 as shown in FIG. 1 is appropriately switched by a switching signal $SW_O$ from the CPU 3, to provide a beam spot diameter corresponding to the selected screen pitch and screen angle. In this embodiment, the size of the beam spot diameter is selected corresponding to the recording density in the sub-scanning direction. When an interpolation is performed, the pulse interval of the main scanning clocks CK is reduced in interpolation as hereinabove described, whereby the recording density in the main scanning direction is increased in response to the rate of increase in pixel density in the main scanning direction by the interpolation. Thus, the tone reproductivity of the recorded image is improved also for the screen structure to be interpolated without reducing the recording speed.

Structure and Operation of the Second Embodiment

Figure 9:
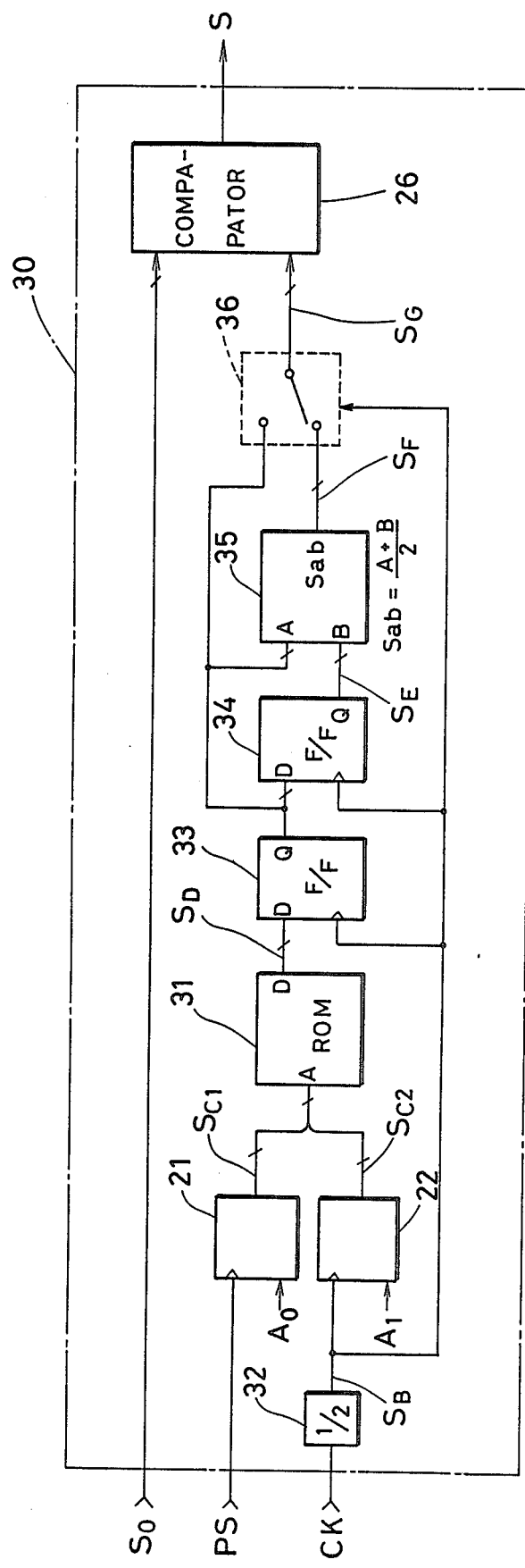
FIG. 9 is a block diagram showing the detailed structure of a second embodiment of the present invention.

FIG. 9 is a block diagram showing the structure of a characteristic part of a second embodiment of the present invention, which corresponds to that of FIG. 7 showing the details of the first embodiment. Since the optical structure of the second embodiment is identical to that of the first embodiment as shown in FIG. 1, the following description is made mainly on elements different from the first embodiment.

Although the second halftone pattern data are obtained before starting of a recording operation in the first embodiment, the second embodiment is adapted to obtain second halftone pattern data in parallel with the recording operation.

Referring to FIG. 9, a halftone dot generator 30 in this embodiment is provided with a ROM 31 in place of the RAM 24 as shown in FIG. 7. The ROM 31 stores previously supplied first halftone pattern data for various screen pitches and screen angles in look-up table form. In the second embodiment, real time operation can be attained since the second halftone pattern data are obtained with the progress of image recording as hereinafter described, whereby neither a microcomputer nor a memory is required to create and store the second halftone pattern data.

Figure 10:
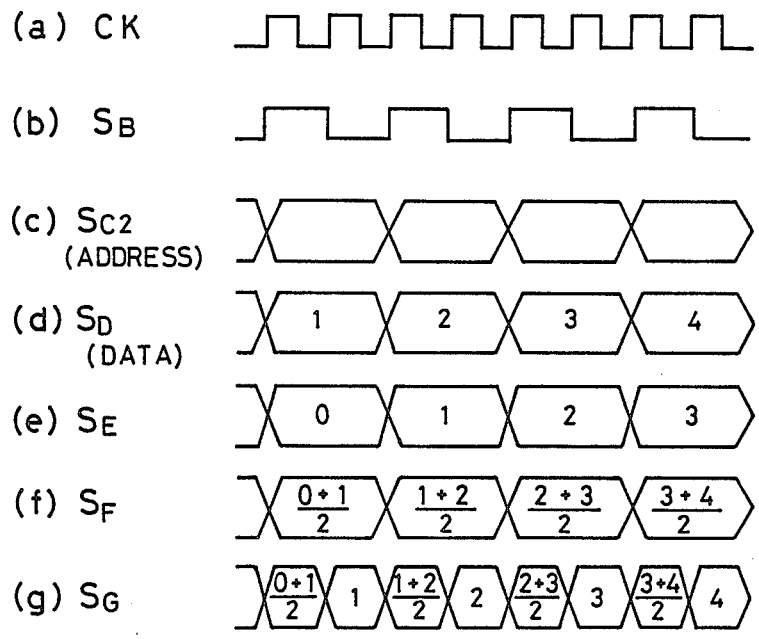
FIG. 10 is a timing chart showing the operation of the apparatus as shown in FIG. 9.

Also with reference to the timing chart shown in Fig. 10, description is now made on the remaining detailed structure and the operation of the second embodiment. First, main scanning clock CK is converted to a clock signal $S_B$ being doubled in successive cycles by means of a one half frequency divider 32 (FIG. 19(a) and (b)). The signal $S_B$ is inputted in a main scanning address counter 22. Similarly to the first embodiment, initial addresses are preset in the main scanning address counter 22 and a sub-scanning address counter 21 respectively by preset signals $A_1$ and $A_0$.

These counters 21 and 22 sequentially count-up in response to the inputted signals PS and CK, so that the counter 21 outputs a sub-scanning address singal $S_{C1}$ and the counter 22 outputs a main scanning address signal $S_{C2}$ (FIG. 10(c)) respectively to the ROM 31. The ROM 31 receives these address signals $S_{C1}$ and $S_{C2}$ to generate first halftone pattern data $S_D$ (FIG. 10(d)). In order to output data for a desired screen structure in such processing, access to the ROM 31 is started from the first address of a storage area storing the data for the selected screen structure.

The data $S_D$ thus outputted are delayed by one clock through a first flip-flop 33, to be inputted in a second flip-flop 34 and further delayed by one clock therein. As the clock signal for the flip-flops 33 and 34, the clock $S_B$ is supplied thereto.

In these delay operations, the delay by the first flip-flop 33 is performed to ensure the switching operation hereafter described, in consideration of the access time in the ROM 31. An output signal $S_E$ (FIG. 10(e)) from the second flip-flop 34 is inputted in a mean value calculator 35 as the B-input thereof. To the B-input of the mean value calculator 35, output from the first flip-flop 33 is supplied. The mean value calculator 35 calculates the mean value of two inputs A and B as follows:

$S_{ab} = (A+B)/2$ thereby to output the mean value $S_{ab}$ as a signal $S_F$. Since the B-input is delayed by one clock period with respect to the A-input, the signal $S_F$ serves as the interpolation value between the first halftone pattern data for adjacent pixels in the main scanning direction as shown in FIG. 10(f).

The interpolated signal $S_F$ and the signal before interpolation outputted from the first flip-flop 33 are switched per half cycle of the clock $S_B$ by a switching circuit 36, so that the same are combined successively to form an output signal $S_G$ (FIG. 10(g)). The signal $S_G$ corresponds to second halftone pattern data. In the case of a screen structure with no interpolation performed, the switching circuit 36 may be adapted to always select the output side of the first flip-flop 33. Thereafter processing such as comparison with the image signal $S_O$ in a comparator 26 and exposure of the photosensitive materials are performed similarly to the first embodiment, and hence description thereof is omitted.

Examples of Recorded Images

Figure 11A:
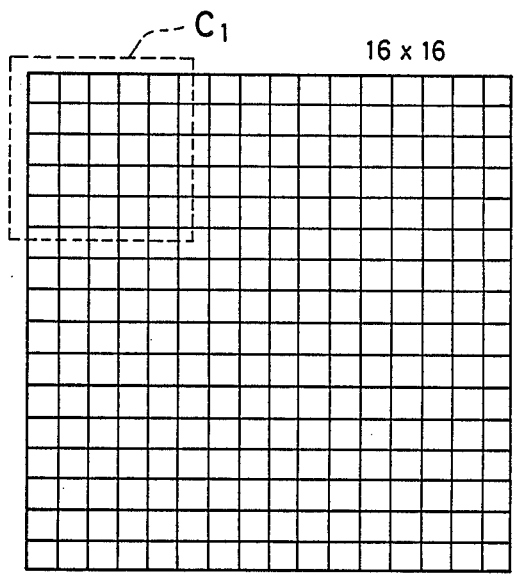
FIG. 11A to 11C and 12A to 12C are examples of data arrays and pixel arrays of recorded images.
Figure 11B:
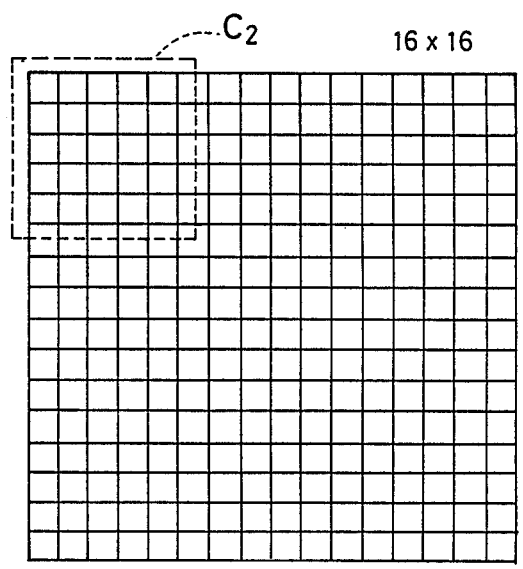
Figure 11C:
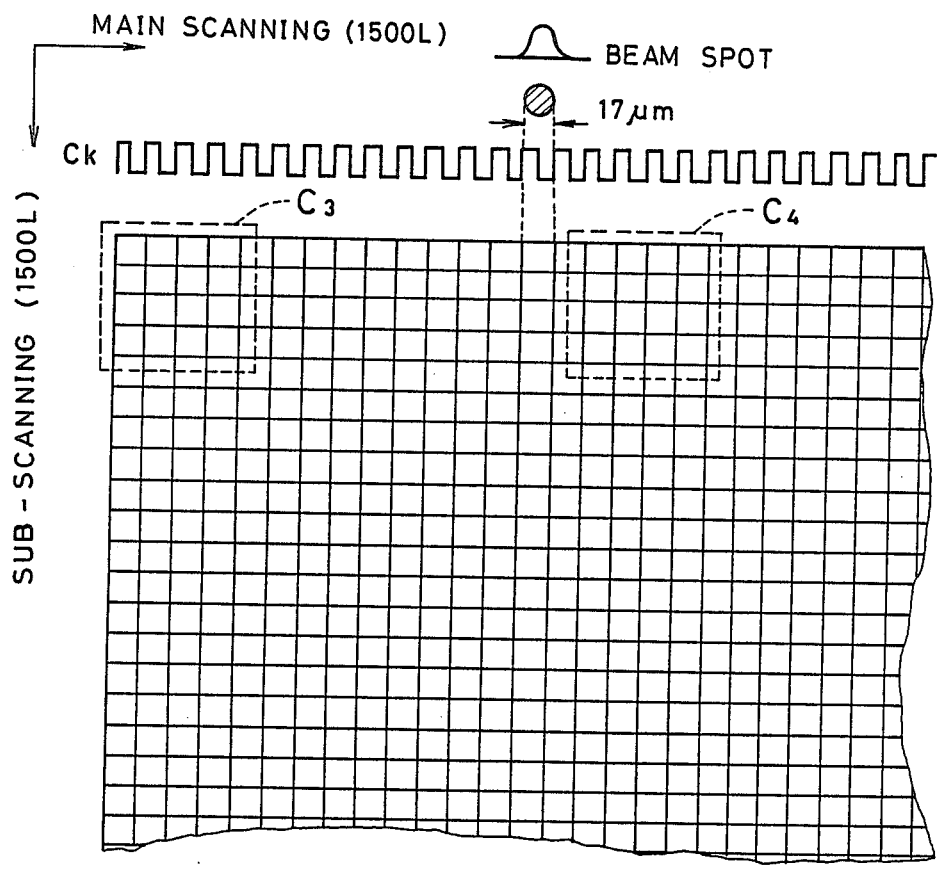

FIGS. 11A and 11B respectively illustrate examples of halftone pattern data stored in the halftone pattern data memory 5 and the RAM 24 in the first embodiment with respect to the case of 133L ($\theta = 45°$) in Table 1. FIG. 11C shows pixel array images in that case. This corresponds to a screen structure with no interpolation performed, and as is obvious from Fig. 11C, recording is made at the scanning pitch of 1500L in both the main and sub-scanning directions.

Figure 12A:
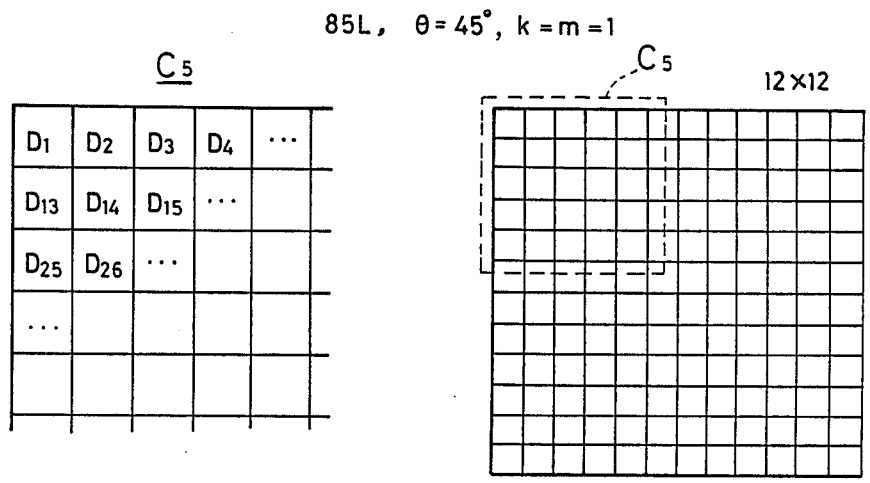
Figure 12B:
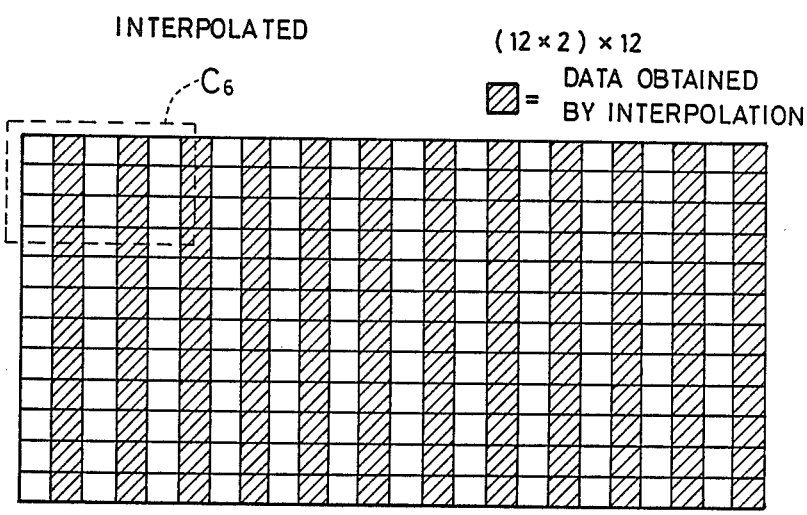
Figure 12C:
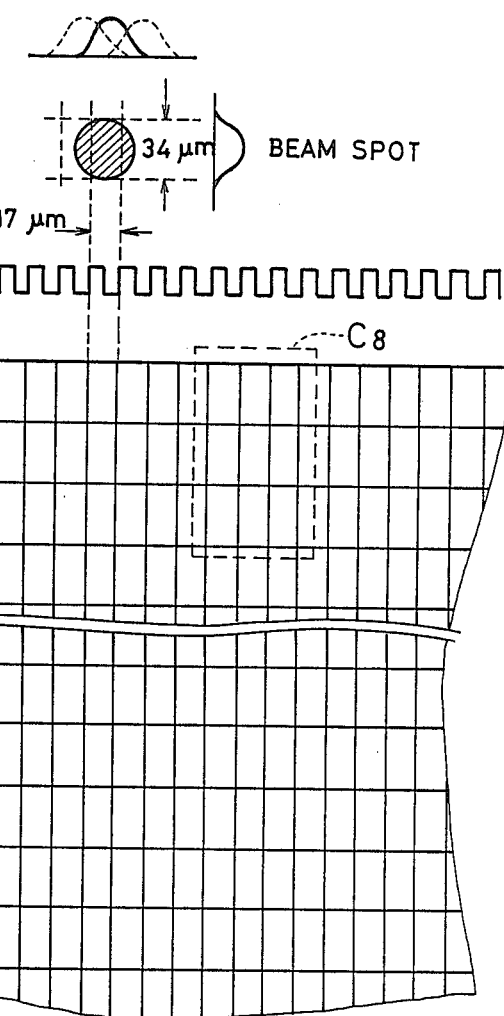

FIG. 12A to 12C illustrate examples in the case of performing interpolation with respect to 85L ($\theta = 45°$) in the same form as FIGS. 11A to 11C. In this case, as is obvious from FIG. 12C, pixels exposed by an optical beam in circular section are arrayed at the pitch of 1500L in the main scanning direction including pixels corresponding to interpolated data. However, the pixels are arrayed at the pitch of 750L in the sub-scanning direction. Thus, such interpolation enables high-speed recording of smooth images.

Figure 14:
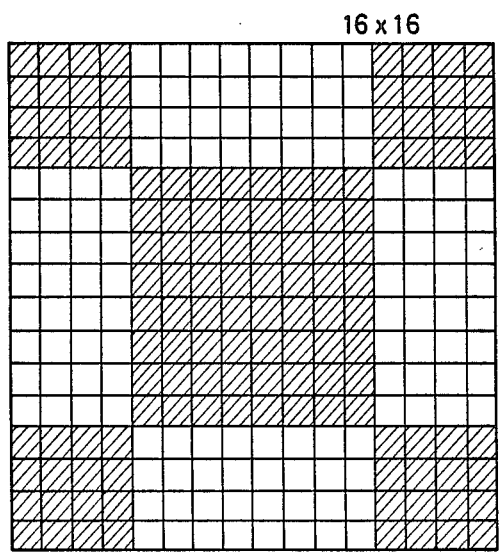

FIG. 13A shows a recorded image in the case of directly employing the coarse screen of 100L ($\theta = 45°$) within the respective ones as shown in Table 2, at the exposure rate of 50%. FIG. 13B shows an interpolated recorded image in a case similar to FIG. 13A. Further, FIG. 14 shows the case of the fine screen of 133L ($\theta = 45°$) also at the exposure rate of 50%. However, in the case of 133L as shown in FIG. 14, no interpolation is performed as hereinabove described. As is obvious from these figures, the tone reproducibility is improved by employing large repetitive unit halftone dot regions and interpolation processing, thereby to obtain smooth recorded images.

In the case where the repetitive unit halftone dot region is provided in a square form, the following processing may be applied: In this processing, the region R as shown in FIG. 3 is first vertically divided into two patterns, so that a memory stores only one of the patterns. With respect to the region having the stored pattern, the pattern data are directly read from the memory. With respect to the other region not having the stored pattern, pattern data are read in a reverse order, performed by inverting the order of giving address signals. Thus, the required capacity of the memory can be further reduced.

Modifications

The present invention is not restricted to the above described structures, but can be modified as follows, for example:

(1) In the aforementioned embodiments, both the technique of increasing the unit halftone dot region and interpolation processing are employed in the cases corresponding to Table 2. In the first and second embodiments herein, however, indispensably required is the interpolation processing; the unit halftone dot region may not necessarily be increased in size. In the interpolation processing, further, two or more interpolated pixels may be inserted between two original pixels.

(2) Interpolation processing may not only be performed by obtaining the mean value of the data for two pixels adjacent in the main scanning direction, but by obtaining the mean value of data for four adjacent pixels in the main and sub-scanning directions respectively. Further, the mean value etc. in a wider range may be used as interpolation data in the main scanning direction.

(3) Although beams circular in section are employed as optical beams for exposure in the aforementioned embodiments, exposure beans having elliptical sections may be used when interpolation is made only in the main scanning direction. This can easily be realized from the fact that beams having elliptical sections can be obtained by performing exposure in positions slightly displaced from ordinary focal positions of laser beams.

(4) Keyboard input may be employed to indicate whether or not interpolation is performed in selection of the screen structure.

(5) Data corresponding to the repetitive halftone dot region of, e.g., $10 \times 20$, may be stored in the halftone pattern memory to obtain data providing a repetitive halftone region of $20 \times 20$ by performing interpolation.

(6) The first halftone pattern data may be prepared to have different recording densities in the main and sub-scanning directions. For example, the first halftone pattern data may be formed by a set of rectangular pixels having respective sides in the main and sub-scanning directions in the ratio of 2:1. In this case, a halftone image formed by a set of square pixels can be obtained similarly to that in a general halftone image recording apparatus by performing output processing while performing such interpolation that the pixel density in the main scanning direction is doubled.

(7) In addition to the screen formed by square halftone dots, the present invention may be applied to those with other shapes of dots. In the case where a desired shape can be selected from a plurality of dot shapes, selection of the pattern structure is performed including designation of the desired shape.

(8) Although the above description has been made with respect to a flat-bed type scanner, the present invention can also be applied to a rotary drum type scanner, a static drum type (internal scanning type) scanner and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A halftone image recording apparatus for creating a halftone plate by sequentially making comparisons of input image signals to be recorded with halftone pattern data, along scanning directions, pixel by pixel, said halftone pattern data given for indicating a regular and repetitive screen pattern defined to express a screen structure in halftone dot image recording and outputting halftone dot recording signals responsive to the results of said comparisons, said halftone image recording apparatus comprising:

first memory means for storing first halftone pattern data;

interpolation means for reading said first halftone pattern data from said first memory means and interpolating said first halftone pattern data in the main scanning direction to obtain second halftone pattern data;

comparator means for sequentially comparing said input image signals with said second halftone pattern data pixel-by-pixel at a timing responsive to the rate of increase in pixel density in the main scanning direction through interpolation by said interpolation means and, in response, outputting halftone dot recording signals; and exposure means for scanning and exposing a prescribed photosensitive material in response to said halftone dot recording signals to create a halftone plate increased in recording density in the main scanning direction in accordance with the rate of increase in pixel density through said interpolation.

2. A halftone image recording apparatus in accordance with claim 1, wherein said exposure means generates an exposure beam having a spot diameter of a size corresponding to the recording pixel density in the sub-scanning direction.

3. A halftone image recording apparatus in accordance with claim 1, wherein said interpolation means includes means for obtaining said second halftone pattern data prestored in a second memory means, to be read from said second memory means for development of said recording signals.

4. A halftone image recording apparatus in accordance with claim 1, wherein said second interpolation means includes means for obtaining said halftone pattern data simultaneously with exposure of said photosensitive material by said scanning means.

5. A halftone image recording apparatus for creating a halftone plate by sequentially making comparisons between input image signals to be recorded and halftone pattern data along scanning directions, pixel-by-pixel, said halftone pattern data given for indicating a regular and repetitive screen pattern defined to express a screen structure in halftone dot image recording and outputting halftone dot recording signals responsive to the results of said comparisons, said halftone image recording apparatus comprising:

first memory means for storing predetermined first halftone pattern data corresponding to respective ones of a prescribed number of types of screen structures;

screen structure selecting means for selecting a desired screen structure from said prescribed number of types of screen structures;

interpolation means for reading said first halftone pattern data from said memory means and interpolating said first halftone pattern data in the main scanning direction when said desired screen structure selected by said screen structure selecting means is that of a prescribed type, thereby to obtain second halftone pattern data;

comparator means for sequentially making comparisons of said input image signals with said second halftone pattern data, pixel-by-pixel at a timing responsive to the rate of increase in pixel density in the main scanning direction through said interpolation to output halftone dot recording signals responsive to the results of said comparisons; and exposure means for scanning and exposing a prescribed photosensitive material in response to said halftone dot recording signals to create a halftone plate increased in recording density in the main scanning direction in response to the rate of said increase in pixel density through an interpolation by said interpolation means.

6. A halftone image recording apparatus in accordance with claim 5, wherein said exposure means includes means for generating an exposure light beam and for varying the size of the spot diameter of said beam in accordance with the recording pixel density in the sub-scanning direction.

7. A halftone image recording apparatus in accordance with claim 6, wherein within said first halftone pattern data corresponding to respective ones of said screen structure types, data with respect to those having a common relation between said selected spot diameter and said screen structure, the apparatus further including means for storing said data, having a common relation in said memory means as common data.

8. A halftone image recording apparatus in accordance with claim 5, wherein said interpolation means includes means for obtaining said second halftone pattern data prior to image recording and stored in second memory means, to be read from said second memory means as said recording signals.

9. A halftone image recording apparatus in accordance with claim 5, wherein said interpolation means includes means for obtaining said second halftone pattern data simultaneously with exposing said photosensitive material by said exposure means.

10. A halftone image recording apparatus for creating a halftone plate by sequentially making comparisons of input image signals to be recorded with halftone pattern data, along scanning directions, pixel-by-pixel, said halftone pattern data given for indicating a regular and repetitive screen pattern to express a screen structure in halftone dot image recording, an outputting halftone dot recording signals responsive to the results of said comparisons, said halftone image recording apparatus comprising:

memory means for storing predetermined first halftone pattern data in correspondence to respective ones of a prescribed number of types of screen structures;

screen structure selecting means for selecting a desired screen structure from said prescribed number of types of screen structures;

interpolation means for reading said first halftone pattern data from said memory means to interpolate said first halftone pattern data in the main scanning direction when said desired screen structure selected by said screen structure selecting means is that of a prescribed type;

comparator means for sequentially obtaining comparisons of said input image signals with said second halftone pattern data, pixel-by-pixel, at a timing responsive to the rate of increase in pixel density in the main scanning direction in accordance with interpolations by said interpolations means to output halftone dot recording signals responsive to the results of said comparisons; and exposure means for scanning and exposing a prescribed photosensitive material in response to said halftone dot recording signals to create a halftone plate increased in recording density in the main scanning direction in response to the rate of increase in pixel density through interpolation by said interpolation means;

said first and second halftone pattern data with respect to a specific screen structure being provided in the unit of a region larger than the minimum region formed by a plurality of halftone dots and satisfying a prescribed repeating rule in both main and sub-scanning directions.

11. A halftone image recording apparatus in accordance with claim 10, wherein said exposure means includes means for generating an exposure light beam and for varying the size of a spot diameter of the exposure light beam responsive to a recording pixel density in a sub-scanning direction.

12. A halftone image recording apparatus in accordance with claim 11, wherein within said first halftone pattern data corresponding to respective ones of said screen structure types, data with respect to those having a common relation between said selected spot diameter and said screen structure, the apparatus further includes means for storing said data having a common relation in said memory means as common data.

13. A halftone image recording apparatus in accordance with claim 10, wherein said interpolation means includes means for obtaining said second halftone pattern data prior to image recording and stored in second memory means, to be read from said second memory means.

14. A halftone image recording apparatus with claim 10, wherein said interpolation means includes means for obtaining said second halftone pattern data during exposing of said photosensitive material by said exposure means.

15. A halftone image recording method, comprising the steps of:

storing first halftone pattern data;

interpolating said first halftone pattern data in a main scanning direction to obtain second halftone pattern data for recording said halftone image on a photosensitive material;

said first halftone pattern data provided for indicating a regular and repetitive screen pattern defined to express a screen structure in halftone dot image recording;

sequentially comparing said input image signals with said second halftone pattern data, pixel-by-pixel, at a timing responsive to a rate of increase in pixel density in the main scanning direction;

in response to comparisons obtained during said comparing step, outputting halftone dot recording signals; and scanning and exposing said photosensitive material in response to said recording signals.

16. The method as defined in claim 15, wherein said scanning and exposing step includes generating an exposure light beam and controlling the diameter of said beem in accordance with recording pixel density in a sub-scanning direction.

17. The method of claim 15, including storing said second halftone pattern data prior to said scanning and exposing step.

18. The method as defined in claim 15, including obtaining said second halftone pattern data simultaneously with said scanning and exposing step.

19. A halftone image recording method, comprising the steps of:

storing predetermined first halftone pattern data corresponding to respective ones of a prescribed number of types of screen structures;

said first halftone pattern data provided for indicating a regular and repetitive screen pattern defined to express a screen structure in halftone dot image recording;

selecting a desired screen structure from said prescribed number of types of screen structures;

interpolating said first halftone pattern data in a main scanning direction when the desired screen structure selected is that of a prescribed type;

sequentially comparing input image signals with the second halftone pattern data, pixel-by-pixel, at a timing responsive to a rate of increase in pixel density in the main scanning direction through interpolation during said interpolating step to develop halftone dot recording signals; and exposing a photosensitive recording medium in accordance with said recording signals to create a halftone plate.

20. The method of claim 19, wherein the exposing step includes generating an exposure light beam and controlling the diameter of said beam in accordance with a recording pixel density in a subscanning direction.

21. The method of claim 20, wherein:

within said first halftone pattern data corresponding to respective ones of said screen structure types, data with respect to those types having a common relation between said selected beam diameter and said screen structure being stored as common data.

22. The method of claim 19, including storing said second halftone pattern data prior to image recording.

23. The method of claim 19, including obtaining said second halftone pattern data simultaneously with image recording.

24. A halftone image recording method, comprising the steps of:

storing predetermined first halftone pattern data corresponding to respective screen structures;

said first halftone pattern data provided for indicating a regular and repetitive screen pattern defined to express a screen structure in halftone dot image recording;

selecting a desired screen structure from among said respective screen structures;

interpolating said first halftone pattern data in a main scanning direction when the desired screen structure selected is that of a predetermined type;

providing the first and second halftone pattern data with respect to a specific screen structure in the unit of a region larger than the minimum region formed by a plurality of halftone dots and satisfying a prescribed repeating rule in both main and sub-scanning directions;

sequentially comparing input image signals with the second halftone pattern data, pixel-by-pixel, at a timing responsive to a rate of increase in pixel density in the main scanning direction through interpolation during said interpolation step to develop halftone dot recording signals; and exposing a photosensitive material in response to said recording signal.

25. The method as defined in claim 24, wherein said exposing step includes generating an exposing light beam and controlling the diameter of said beam in response to a recording pixel density in a sub-scanning direction.

26. The method as defined in claim 24, wherein:
within said first halftone pattern data corresponding to respective ones of said screen structure types, data with respect to those having a common relation between said selected spot diameter and said screen structure are stored as common data.

27. The method as defined in claim 24, including storing said second halftone pattern data prior to image recoring.

28. The method as defined in claim 24, including obtaining said second halftone pattern data during image recording.

* * * * *